United States Patent Office 2,980,648
Patented Apr. 18, 1961

2,980,648
STABILIZED POLY-α-OLEFIN COMPOSITIONS

Alan Bell, William M. Gearhart, and John W. Tamblyn, Kingsport, Tenn., assignors to Eastman Kodak Company, Rochester, N.Y., a corporation of New Jersey No Drawing. Filed Mar. 31, 1958, Ser. No. 724,814

4 Claims. (Cl. 260—45.85)

This invention relates to the stabilization of poly-α-olefin compositions. A preferred embodiment of the invention relates to the stabilization of polyethylene and polypropylene compositions against deterioration resulting from exposure to sunlight or ultraviolet light.

Poly-α-olefins such as polyethylene, polypropylene and the like are subject to photo-oxidation when exposed to sunlight. This oxidation is characterized in its earlier stages by the breaking of a polymer chain and the formation of carbonyl groups in the polymer's molecule. As the oxidation continues, the polymer cracks and loses tensile strength to the point of mechanical failure. A number of so-called ultraviolet inhibitors are known which inhibit the photo-degradation of many polymers, resins or polyesters. However, many effective stabilizers for halogen-containing polymers, for example, such as polyvinyl chloride, polyvinylidene chloride and the like are not effective stabilizers in poly-α-olefins as stabilizers in halogen-containing polymers function essentially as hydrogen chloride scavengers while stabilizers in poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins. Hence, it is highly unpredictable as to whether a given stabilizer or ultraviolet inhibitor will be effective in poly-α-olefin compositions short of actually testing the inhibitor in poly-α-olefins.

It is an object of this invention to provide new poly-α-olefin compositions of high stability.

It is a further object of this invention to provide novel polyethylene and polypropylene compositions containing additives that improve the stability of the polyethylene and polypropylene compositions against deterioration resulting from exposure to sunlight or ultraviolet light.

It is likewise an object of this invention to provide new polyethylene and polypropylene compositions having incorporated therein substituted phenyl salicylates especially effective as ultraviolet inhibitors therefor.

Other objects of the invention will be apparent from the description and claims which follow.

The present invention comprises poly-α-olefin compositions having incorporated therein substituted phenyl salicylates having the following formulas:

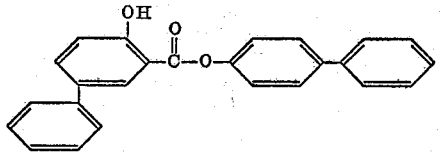

4-biphenylyl-5-phenyl salicylate

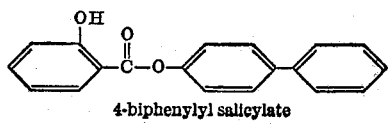

4-biphenylyl salicylate

The present substituted phenyl salicylates can be used to stabilize a wide variety of poly-α-olefins including polyethylene, polypropylene, poly-4-methylpentene-1, poly-3-methylbutene-1 and other normally solid poly-α-olefins prepared from normally gaseous α-monoolefinic aliphatic hydrocarbons containing 2 to 10 carbon atoms. Both "low density" and "high density" poly-α-olefins can be stabilized. Conventional polyethylene, for example, "low density" polyethylene, usually has a density of about 0.91–0.93 and can be prepared by methods including the method disclosed by Fawcett et al. in U.S. Patent No. 2,153,553. "High density" polyethylene, for example, usually has a density of about 0.94–0.97 and it and other "high density" poly-α-olefins can be prepared by such methods as are disclosed in co-pending applications, Coover U.S. Serial No. 559,536 which was filed January 17, 1955, and Coover U.S. Serial No. 615,609 which was filed October 3, 1956. The present substituted phenyl salicylate ultraviolet inhibitors can be used to stabilize the conventional solid polyethylene compositions, which usually have average molecular weights of at least 15,000 and usually at least 20,000, as well as the lower molecular weight polyethylene waxes.

The amount of the present stabilizer employed in poly-α-olefin compositions can be widely varied, the stabilizing amount used varying with the particular use to which the poly-α-olefin composition is to be put. Concentrations of at least 0.1% are suitably used, with concentrations of 0.1% to 10% being more generally used, and concentrations of 0.5% to 5% and often 0.5% to 2.5% being preferably used, the concentration of stabilizer being based on the weight of the poly-α-olefin.

The stabilizers of the invention can be incorporated or blended into poly-α-olefin compositions by any of the conventional methods used for blending such materials into normally solid resins or plastics. Typical of such methods that can be suitably employed include milling on heated rolls, deposition from solvents and dry blending.

The substituted phenyl salicylates of the invention lend to poly-α-olefins improved stability, and more specifically, improved stability against deterioration resulting from exposure to sunlight or outdoor weathering. Thus, poly-α-olefins protected against ultraviolet deterioration have an extended life expectancy and can be used more effectively than unstabilized poly-α-olefins for such uses as outdoor containers, covers for green houses, mulches, floats and buoys and for a diversity of other outdoor uses.

The invention is illustrated by the following examples of preferred embodiments thereof.

EXAMPLE 1

Polyethylene samples containing one of the following additives: 4-biphenylyl-5-phenyl salicylate, 4-biphenylyl salicylate, phenyl salicylate, and 2-mercaptobenzimidazole, as well as a sample containing no stabilizer additive, were subjected to an outdoor weathering test. The various additives were incorporated into polyethylene having a molecular weight of about 30,000 and a density of 0.945 at a concentration of 1% by weight based on the polyethylene by milling on heated rollers in accordance with usual practice. Thereafter, the polyethylene was compression molded into sheets 1/16 inch thick. Samples of the resulting sheets contained the various additives and the control sample containing no additive were exposed to outdoor weathering on a rack facing south at an angle with the horizontal of 36.5° at Kingsport, Tennessee. The carbonyl content of the various samples was determined before exposure and after 2 months exposure by measurement of the infrared absorption in the 5.82 μ region. An arbitrary carbonyl unit was given to the carbonyl increase for comparative purposes. The determination of the carbonyl increase gives an early and reliable indication of photo-oxidation in polyethylene. The carbonyl increase in the resulting samples is set out in Table 1 below. Reference is made to the following two publications concerning the determination of carbonyl content by infrared measurements: Rugg, Smith and Bacon, J. Polymer Sci., 13, 535 (1954) and Cross, Richards and Willis, Discussions Faraday Soc., No. 9, 235 (1950).

Table 1

| Additive | Carbonyl Unit Increase After 2 Months of Outdoor Exposure |
| --- | --- |
| None | 17 |
| Phenyl salicylate | 7 |
| 2-Mercaptobenzimidazole | 2 |
| 4-Biphenylyl-5-phenyl salicylate | 0 |
| 4-Biphenylyl salicylate | 0 |

As can be observed from the data in the above table, the subject substituted phenyl salicylates are significantly better than phenylsalicylate and 2-mercaptobenzimidazole as stabilizers for polyethylene against deterioration resulting from outdoor exposure. The compound, 2-mercaptobenzimidazole, is included for comparative purpose as this compound was described in U.S. Patent 2,727,879 as a light stablizer for polyethylene that is superior for this purpose over a wide variety of conventional plastic, rubber and fat stabilizers.

EXAMPLE 2

Polyethylene samples having a molecular weight of about 30,000 and a density of about 0.945 were prepared in the form of 5 mil thick films, 2½ by ½ inches in size, with 1% by weight of one of the following additives: 4-biphenylyl-5-phenyl salicylate, 4-biphenylyl salicylate and phenyl salicylate incorporated therein. These films, together with a sample of film containing no additive, were exposed to outdoor weathering as described in Example 1 for 12 months. The exposed films were tested for deterioration resulting from the weathering by elongation measurements on an Instron Tensile Tester at a rate of stretch of 2,000% per minute. The films were conditioned 3 days at 73% F. at a relative humidity of 50%. The results of the tests are summarized by the data set out in table 2 below.

Table 2

| Additive | Percent Original Elongation Retained After 12 Months of Outdoor Exposure |
| --- | --- |
| None | 12 |
| Phenyl salicylate | 13 |
| 4-Biphenylyl-5-phenyl salicylate | 98 |
| 4-Biphenylyl salicylate | 94 |

As determined from the elongation measurements described above, the substituted phenyl salicylates of the invention are several times more effective than phenyl salicylate for stabilizing polyethylene against deterioration resulting from exposure to outdoor weathering and ultraviolet light.

EXAMPLE 3

Samples of polypropylene having a melt index (A.S.T.M. D1238–52T) of 0.08 and an ash content of 0.43% containing 1% by weight of one of 4-biphenylyl salicylate and 2-mercaptobenzimidazole incorporated therein by milling on heated rolls were extruded into sheets 20 mils thick and thereafter cut into 2½ by ½ inch samples. Like polypropylene samples containing no additive were prepared. The prepared samples were exposed for varying lengths of time in an Atlas Twin-Arc Weather-Ometer as described in Anal. Chem. 25, 460 (1953) that was modified by the addition of 10 Westinghouse 20 watt fluorescent sun lamps. Exposure damage to the samples of polypropylene were assessed from time to time during exposure with respect to change of flexural strength and inherent viscosity, and the results summarized in table 3 below.

Table 3

| Stabilizer | Percent Initial Flexural Strength Left After 450 Hours' Exposure | Percent Initial Inherent Viscosity Left After 95 Hours' Exposure |
| --- | --- | --- |
| None | 0 | 23 |
| 2-Mercaptobenzimidazole | 0 | 39 |
| 4-Biphenylyl salicylate | 55 | 85 |

The flexural strength set out in the table was determined by the Tour-Marshall Test (A.S.T.M. D747–43), and the inherent viscosity set out in the table was a measurement of inherent viscosity of tetralin solutions, 0.25 g. polymer per 100 cc. at 145° C. being used. The polypropylene used had an inherent viscosity of 2.77.

The substituted phenyl salicylates of the invention can be prepared in accordance with the methods described in Examples 4 and 5 set out below.

EXAMPLE 4

Preparation of 4-biphenylyl salicylate.—A 41.4 g. sample of salicylic acid and a 51 g. sample of p-hydroxy biphenyl were melted at 180° C. Thereafter, 30 cc. of phosphorous oxytrichloride were added over a half hour period, the temperature being kept at 160°–180° C. The resulting mixture was heated for another hour at 140° C., the resulting reaction mixture cooled and then poured onto ice to form a resinous white solid. The resinous white solid was slurried in water alkalinized with sodium bicarbonate, filtered therefrom, and then washed and dried. This product weighed 56 grams and had a melting point of 85–100° C. On two recrystallizations from methanol, 18 g. of product resulted having a melting point of 104–106° C. Based on an empirical formula of $C_{19}H_{14}O_2$, the carbon-hydrogen analysis and the saponification value was as follows:

(a) *Carbon-Hydrogen Analysis.*—Found: 78.2% C, 5.0% H. Calculated: 78.7% C, 4.86% H.

(b) *Saponification Value.*—Found: 284, 296.7. Calculated 290.

EXAMPLE 5

Preparation of 4-biphenylyl-5-phenyl salicylate.—A 12 g. sample of 5-phenyl salicylic acid was mixed with a 9.5 g. sample of p-hydroxy biphenyl and suspended in toluene which was heated to about 135° C. After the materials were dissolved, 5.6 cc. of phosphorous oxytrichloride were added dropwise. Thereafter, the resulting mixture was refluxed until crystals started to appear at the upper surface of the liquid of the reaction vessel. More xylene was added and the resulting solution was decanted and cooled. Crystals melting at about 210° C. formed which were probably part of the unreacted starting material. Recombined with the decanted xylene and a 1 cc. portion of phosphorous oxytrichloride, the resulting mixture was boiled until a slight tar started to form on the sides of the reaction vessel. The resulting reaction mixture was decanted into water and the xylene azeotroped off. The azeotroped mixture was allowed to cool to room temperature and the resulting water-insoluble crystals filtered off and recrystallized from methanol. The melting point of the product was 136–137% C. A yield of 90% 4-biphenylyl-5-phenyl salicylate was obtained.

As described above, the present invention provides poly-a-olefin compositions of improved stability—particularly improved stability against deterioration resulting from exposure to ultra-violet light or outdoor weathering.

Although the invention has been described in considerable detail with reference to certain preferred embodiments thereof, it will be understood that variations and modifications can be effected within the spirit and scope of the invention as described hereinabove and as defined in the appended claims.

We claim:

1. A solid poly-α-olefin composition substantially free of halide material comprising a solid poly-α-olefin prepared from an α-monoolefinic aliphatic hydrocarbon having 2 to 3 carbon atoms containing 0.1% to 10% by weight based on said poly-α-olefin of a substituted phenyl salicylate selected from the group consisting of 4-biphenylyl-5-phenyl salicylate and 4-biphenylyl salicylate.

2. A solid poly-α-olefin composition comprising solid polyethylene containing 0.5% to 5% by weight based on said polyethylene of 4-biphenylyl-5-phenyl salicylate.

3. A solid poly-α-olefin composition substantially free of halide material comprising solid polyethylene containing 0.5% to 5% by weight based on said polyethylene of 4-biphenylyl salicylate.

4. A solid poly-α-olefin composition substantially free of halide material comprising solid polypropylene containing 0.5% to 5% by weight based on said polypropylene of 4-biphenylyl salicylate.

References Cited in the file of this patent

UNITED STATES PATENTS

| | | |
|---|---|---|
| 2,432,517 | Dreyfus | Dec. 16, 1947 |
| 2,464,250 | Moll et al. | Mar. 15, 1949 |
| 2,755,259 | Dilke et al. | July 17, 1956 |
| 2,773,778 | Hoch et al. | Dec. 11, 1956 |
| 2,834,768 | Friedlander | May 13, 1958 |